United States Patent [19]

Shirts et al.

[11] Patent Number: 4,552,730

[45] Date of Patent: Nov. 12, 1985

[54] RECOVERY OF TITANIUM FROM PEROVSKITE USING SULFURIC ACID LEACHING

[75] Inventors: Monte B. Shirts, South Jordan; Dale A. Martin; Allan E. Petersen, both of Salt Lake City, all of Utah

[73] Assignee: The United States of America as represented by the Secretary of the Interior, Washington, D.C.

[21] Appl. No.: 644,303

[22] Filed: Aug. 27, 1984

[51] Int. Cl.$^4$ .......................................... C01G 23/00
[52] U.S. Cl. ...................................... 423/82; 423/85; 423/86; 423/544
[58] Field of Search ................... 423/82, 85, 86, 544

[56] References Cited

U.S. PATENT DOCUMENTS 3,760,058  9/1973  Langmesser et al. ............... 423/544
4,288,416  9/1981  Davis et al. ........................ 423/82
4,321,236  3/1982  Stambaugh et al. ................ 423/82

FOREIGN PATENT DOCUMENTS 228396  5/1958  Australia ............................ 423/82

Primary Examiner—H. T. Carter

[57] ABSTRACT

A method of recovering titanium from perovskite by leaching with a strong sulfuric acid solution is disclosed. The leaching produces a sulfate solution containing titanium and a calcium sulfate residue when the time and temperature of leaching are controlled as a function of the grind size of the perovskite and concentration of the sulfuric acid. The titanium-containing solution and the calcium sulfate residue are then separated. The titanium in the leach solution is precipitated by heating, as a mixture of titanium sulfates, which are then redissolved in water or dilute acid solution. Titanium dioxide may then be prepared by hydrolysis of the titanium in the resulting aqueous solution.

5 Claims, 4 Drawing Figures

RECOVERY OF TITANIUM FROM PEROVSKITE USING SULFURIC ACID LEACHING

FIELD OF THE INVENTION

The present invention relates generally to recovery of titanium dioxide from perovskite, and more particularly to the leaching of perovskite with sulfuric acid to extract titanium.

BACKGROUND OF THE INVENTION

Most of the raw feed materials used for the production of strategic titanium metals and pigment are imported to the U.S. This dependence on foreign countries for sources of titanium is undesirable. The U.S. does contain sources of domestic perovskite ores, but a simple and cheap method of recovering titanium from perovskite ore has not been available.

One prior art method of processing perovskite for the recovery of titanium is disclosed in an article by G. W. Elger, W. L. Hunter, and J. E. Manser, entitled "Preparation and Chlorination of Titanium Carbide from Domestic Titaniferous Ores", in "Report of Investigations 8497, Bureau of Mines, 1980, pp. 20. According to this method, perovskite is reacted with carbon at high temperatures in an electric furnace to produce titanium carbide. This titanium carbide is then chlorinated to produce titanium tetrachloride. Unfortunately, this method is energy intensive and the carbide formed has an extremely high melting point which creates physical handling problems in the furnace.

Another prior art method for recovering titanium is disclosed in an article by Y. G. Goroshchenko, V. I. Belokoskov, Y. A. Fromin, and M. I Andreeva, entitled "Laboratory Experiments on Processing of Perovskite by Fusion with Ammonium Sulfate and Sulfuric Acid", Sbornik Trudov Khim, Tekhnol; Mineral; Syrlya, Kolsk; Poluostrova 1959, No. 1, pp. 25-39. In this method, a sulfuric acid-ammonium sulfate fusion is followed by leaching and precipitation. Unfortunately, the process is reagent intensive, the fusion mass is thick and sticky, and the reaction time is several hours.

A third method of recovering titanium is disclosed in an article by Y. G. Goroshchenko, D. L. Motov, G. V. Trofimov, and V. I. Belokoskov, entitled "Continuous Process of Sulfuric Acid Decomposition of Titanium-Niobium Concentrates", Invest; Karelski Kolsk; Filail, Akad; Narik S.S.S.R. 1959, No. 4, pp. 135-141. In this method, a sulfuric acid digestion that contains some ammonium sulfate is utilized and this is followed by extraction. The titanium is eventually precipitated as a double salt of ammonia. This process is complicated and is reagent intensive in that all excess acid is converted to ammonium sulfate by reaction with ammonia.

Another method for recovering titanium from perovskite is disclosed in Canadian Pat. No. 1,052,581 (Kelly and Oughton) entitled "Treatment of Calcium Titanate". In this method, perovskite is treated by roasting at 1200° C. in hydrogen sulfide gas. This is followed by leaching to remove calcium and iron sulfides which leaves the titanium as titanium oxide. The disadvantages of this process are the high temperature and the use of highly toxic gas.

Still another procedure for recovering titanium is disclosed in an article by B. Kestriken, N. Melentiv and V. A. Reynichenko, entitled "Autoclave Opening of Perovskite Concentrate", Miner; Syre, Vses; Nanch.-Issled, Inst., Miner; Syrga, No. 13, 1966, pp. 63-69. In this procedure, perovskite is leached with nitric acid in an autoclave. Unfortunately, this chemical is expensive and corrosive.

As indicated above, there is a need for a simple and inexpensive method of obtaining titanium from perovskite.

SUMMARY OF THE INVENTION

In accordance with the present invention, a method for recovering titanium from perovskite and its recovery as titanium dioxide is disclosed. Initially, the perovskite is leached with strong sulfuric acid solution to solubilize the titanium and convert the calcium to insoluble calcium sulfate. The titanium-bearing solution is then separated from the insoluble calcium sulfate residue. The titanium in the acid leach solution is then precipitated by heating, as mixed titanium sulfates, which, after separation from the leach solution, are redissolved in water or a dilute acid solution.

In the acid leaching of the perovskite, the time and temperature must be controlled as a function of the grind size of the perovskite and the concentration of the sulfuric acid so that a separable titanium-bearing solution and an insoluble calcium sulfate residue are produced.

Hydrated titanium dioxide may then be readily prepared by hydrolysis of the aqueous solution of mixed titanium sulfates by conventional means. The hydrated titanium dioxide finds extensive use in preparation of synthetic rutile and titanium pigments.

After separating the soluble titanium from the calcium sulfate residue, the residue is preferably washed with water and discarded. The wash water, now containing dilute acid, is subsequently used to dissolve the mixed titanium sulfates precipitate. Preferably, the mixed titanium sulfates precipitate is redissolved at temperatures between about 60° and 150° C.

In precipitating the titanium sulfates from the acid leach solution, the solution is heated to a temperature at or near boiling. Subsequently, the mixed titanium sulfates precipitate is separated from the remaining solution which consists primarily of sulfuric acid. This sulfuric acid may then be recycled and used to leach additional perovskite. In the preferred embodiment, precipitation of mixed titanium sulfates from the acid leach solution occurs at about 211° C.

It is an advantage of the present invention that relatively low temperatures are needed for extracting titanium from perovskite. In addition, the solution and materials involved in the process can be processed using conventional equipment.

Still another advantage of the present invention is the use of sulfuric acid in the process, sulfuric acid being less toxic and corrosive than prior art acids used for this purpose.

Other advantages of the process of the present invention are that the process is not reagent intensive, is not energy intensive, and utilizes fewer reagents.

It is a feature of the present invention that titanium dioxide of good chemical purity is produced.

Another feature of the present invention is that the process utilizes a cheap, plentiful reagent at moderate temperatures and reaction times in a minimum of steps to extract titanium from perovskite.

Other features and advantages of the present invention are stated in or apparent from the detailed description of a preferred embodiment of the invention found hereinbelow.

DETAILED DESCRIPTION OF THE PREFERRED EMBODIMENT

Figure 1:
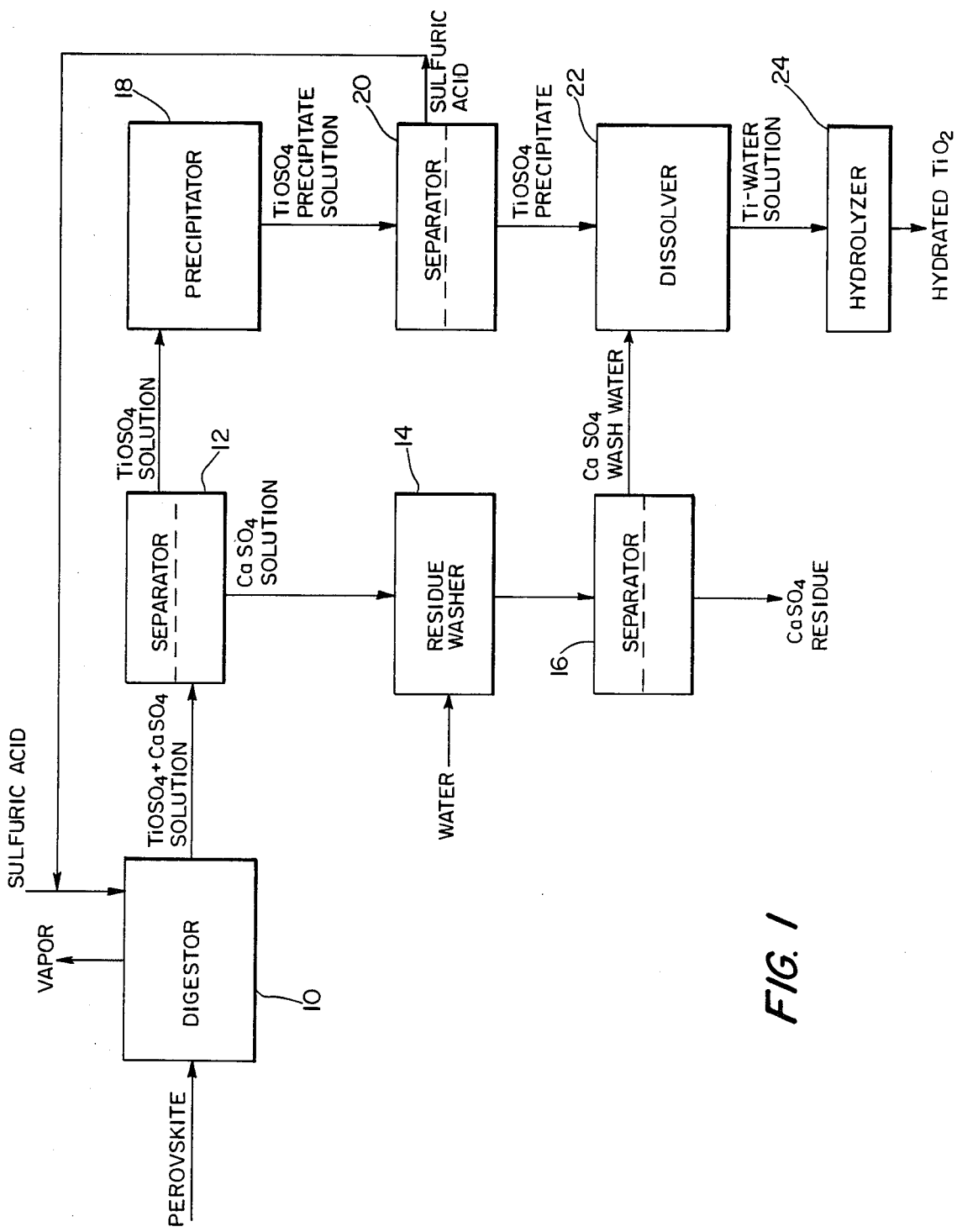
FIG. 1 is a schematic flow sheet of the process for recovering titanium from perovskite using sulfuric acid according to the present invention.

Depicted in FIG. 1 is a schematic representation of the method of recovering titanium from perovskite using sulfuric acid leaching according to the present invention. As shown, ground perovskite is initially introduced into a digestor 10 where the leaching occurs. Sulfuric acid is also introduced into digester 10 from a suitable source. The source of sulfuric acid preferably includes recycled sulfuric acid as explained subsequently. The titanium is leached in the digestor from the ground perovskite. The reaction of perovskite with sulfuric acid can be represented by, but is not limited to the following:

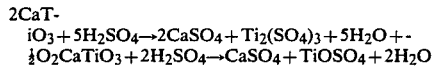

$2CaTiO_3 + 5H_2SO_4 \rightarrow 2CaSO_4 + Ti_2(SO_4)_3 + 5H_2O +  \frac{1}{2}O_2CaTiO_3 + 2H_2SO_4 \rightarrow CaSO_4 + TiOSO_4 + 2H_2O$ The mixed titanium sulfates remain soluble in the acid leach solution only when the time and temperature of the leach is specifically controlled for grind size and the acid concentration selected.

It has been found that the rate and efficiency of extraction of titanium from the perovskite is dependent upon grind size, acid concentration, temperature, and time. In particular, it has been found that titanium at all sets of conditions rapidly extracts into solution, reaches a maximum concentration, and then rapidly precipitates. Regardless of the conditions chosen, i.e., acid strength, temperature, and grind size, there exists a time when maximum titanium extraction occurs. Therefore, it is essential that the leaching be terminated and the pulp filtered at the proper time to achieve maximum extraction. The pulp can be filtered using any conventional filtration equipment that can operate under the temperature and acid conditions.

Figure 2:
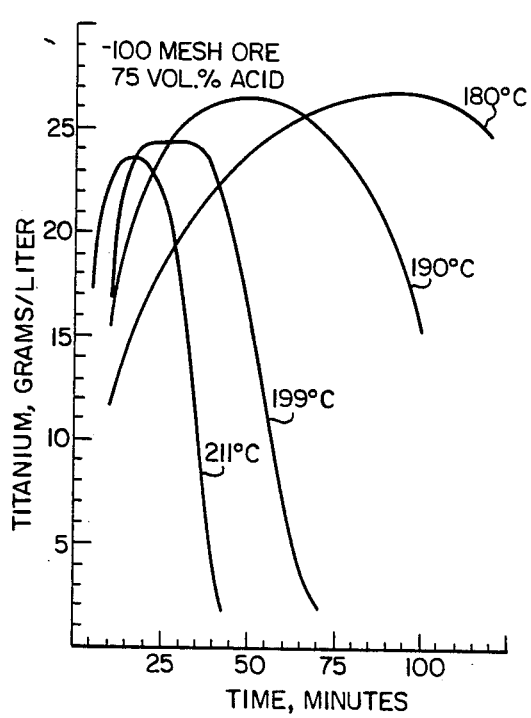
FIG. 2 is a graphical representation of the effect of temperature on the time needed for titanium extraction according to the present invention.
Figure 3:
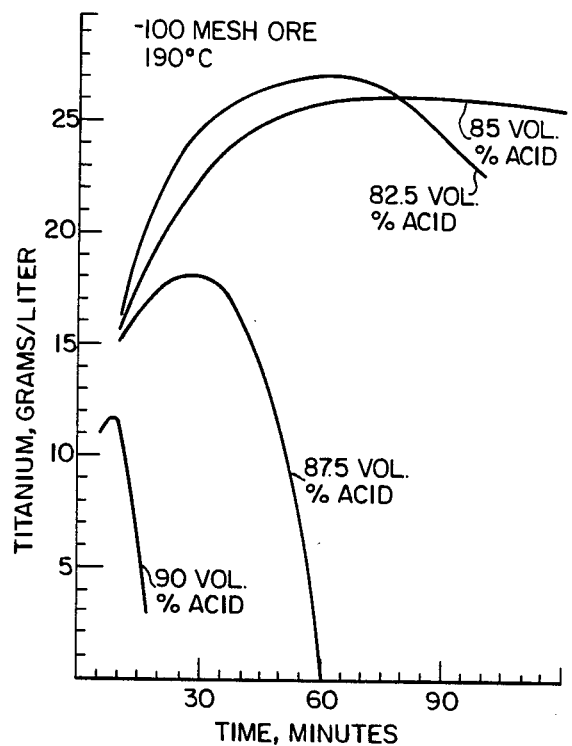
FIG. 3 is a graphical representation of the effect of sulfuric acid concentration on titanium extraction according to the present invention.
Figure 4:
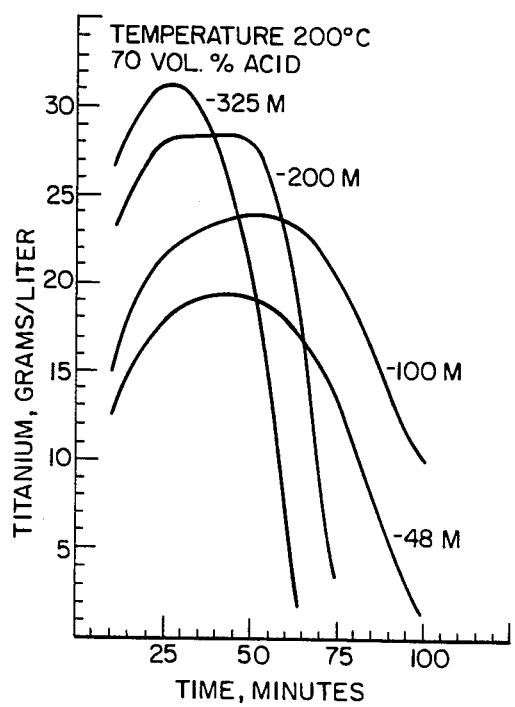
FIG. 4 is a graphical representation of the effect of perovskite particle size on titanium extraction according to the present invention.

Suitable grind sizes of the perovskite feed will generally range from about minus 10 to minus 400 mesh, with suitable acid strengths being about 50 to 90 volume percent $H_2SO_4$. Optimum temperatures may also vary considerably with different grind sizes and acid concentrations, e.g., optimum temperatures may range from about 150° C. to 220° C. As illustrated in the examples below, the optimum time of extraction will vary considerably depending upon the exact conditions of leaching. As will be seen from FIGS. 2, 3 and 4 of the drawing, optimum time periods varied from about 15 to 95 minutes.

After the perovskite has been leached in digestor 10 under the proper conditions, the acid leach solution is filtered in separator 12. This produces a residue which is composed predominantly of calcium sulfate and a pregnant acid leach solution containing the titanium.

The residue is conducted to residue washer 14 where it is washed with water. The mixture from residue washer 14 is conducted to separator 16 which produces a calcium sulfate waste residue and a wash water containing small amounts of sulfuric acid, titanium, and other dissolved impurities.

The pregnant acid leach solution from separator 12 is passed to precipitator 18, where it is heated to produce a precipitate of mixed titanium sulfates. It has been found that the titanium is nearly completely precipitated when the acid leach solution is boiled at about 211 C.° for about 60 min. Lowering the temperature results in longer retention times and less complete precipitation. The rate of precipitation can be enhanced by seeding the pregnant acid leach solution with mixed titanium sulfate crystals prior to heating.

The mixed titanium sulfates precipitate slurry produced in precipitator 18 is then introduced into separator 20, where the mixed titanium sulfates precipitate is separated from the remaining solution. The remaining solution, containing sulfuric acid, is recycled and used for further leaching of newly introduced perovskite in digestor 10.

The separated mixed titanium sulfates precipitate from separator 20 is introduced into dissolver 22, where it is redissolved in water or a recycled dilute acid solution. Conveniently, the solution used in dissolver 22 is the dilute acid recycle solution from separator 16. The precipitated mixed titanium sulfates have been found to redissolve readily in water or dilute acid solutions at room temperature in about 10 hours, or in about 1 hour at 60° C. The temperature can be as high as 150° C. As the temperature is increased the leach time is decreased and the probability of reprecipitating the titanium is increased.

The titanium-containing water leach solution from dissolver 22 can be treated by commercially used procedures for producing hydrated titanium dioxide. As an example, the titanium-containing water leach solution can be heated, at temperatures of about 80° C. to 200° C., to produce hydrated titanium dioxide.

The following examples will more specifically illustrate the method of invention.

EXAMPLE 1

One hundred grams of minus 200-mesh perovskite concentrate containing 28.2 pct titanium was leached at 190° C. in 1,743 g of 85 vol pct sulfuric acid. After 40 minutes of leaching, the slurry was filtered while still at 180° C. The predominantly calcium sulfate residue weighed 198 g and was washed with 300 g of water. The filtered acid leach liquor weighed 1,605 g and was heated to boiling (211° C.) for 60 min. The resulting 128 g of mixed titanium sulfates precipitate was removed by filtration. Residue wash water was used to leach the mixed titanium sulfates precipitate at 60° C. for 3 hours. The resulting low acid solution contained 95 pct of the titanium at a concentration of 190 g per liter. The resulting solution was then hydrolyzed to precipitate hydrated titanium dioxide.

EXAMPLE 2

In order to determine the effect of temperature on titanium extraction, the following experiment was performed. One hundred grams of minus 100-mesh ore was leached in 1,000 ml of 75 vol pct sulfuric acid at 180° C. Samples of the solution were extracted at timed intervals and analyzed for titanium content. Titanium extraction rapidly increased, reaching a maximum at 95 minutes, and decreased thereafter. Similar tests at temperatures of 190° C., 199° C., and 211° C. resulted in similar curves, but the maximum extraction peaks occurred at times of 50, 35, and 20 minutes, respectively. Overall titanium extraction also decreased as the temperature exceeded 190° C. The results of this experiment are depicted graphically in FIG. 2.

EXAMPLE 3

Tests similar to those performed in Example 2 were also conducted in order to determine the effect of sulfuric acid concentration on titanium extraction. In these experiments, the temperature was held constant at 190° C. and the acid strength was varied from 82.5 to 90 vol pct. When the acid strength was greater than 85 vol pct, the time for maximum extration decreased. In addition, the maximum titanium extraction also decreased as the acid strength increased above 85 vol pct. Results of these experiments are shown graphically in FIG. 3.

EXAMPLE 4

In order to determine the effect of particle size on titanium extraction, the following procedure was used. One hundred grams of perovskite concentrate was leached in 1,000 ml of 70 vol pct sulfuric acid at 200° C. Samples of the solution were analyzed for titanium content at timed intervals. Similar tests were run using minus 48-, 100-, 200-, and 325-mesh size concentrates. Maximum extraction of titanium increased and the time decreased as the particle size decreased. Using minus 48-mesh concentrate, the maximum extraction occurred at 50 minutes whereas using minus 325-mesh concentrate, the maximum extraction occurred in 30 minutes. The results of these experiments are depicted graphically in FIG. 4.

While the present invention has been described with respect to an exemplary embodiment thereof, it will be understood by those of ordinary skill in the art that variations and modifications can be effected within the scope and spirit of the invention.

What is claimed is:

1. A method of treating perovskite to produce a titanium-bearing solution suitable for recovering the titanium as hydrated titanium dioxide, comprising the steps of:
    (a) leaching the perovskite with a strong sulfuric acid solution to produce a slurry of pregnant acid leach solution containing dissolved titanium and insoluble calcium sulfate;
    (b) separating the titanium-containing pregnant acid leach solution from the insoluble calcium sulfate residue;
    (c) precipitating mixed titanium sulfates from the pregnant acid leach solution by heating said solution;
    (d) separating the mixed titanium sulfates precipitate from the remaining sulfuric acid solution; and
    (e) redissolving the mixed titanium sulfates precipitate in water or dilute acid solution.

2. The method of claim 1 wherein leaching perovskite in step (a) includes controlling the leach time as a function of perovskite grind size, sulfuric acid concentration, and temperature to produce titanium-containing pregnant acid leach solution and insoluble calcium sulfate residue.

3. The method of claim 1 including the additional step of recycling the remaining sulfuric acid solution from step (d) for use in leaching of additional perovskite.

4. The method of claim 1 including the additional step of hydrolyzing the dissolved mixed titanium sulfates to produce hydrated titanium dioxide.

5. The method of claim 1 including the additional steps of washing the separated calcium sulfate residue from step (b) with water, separating the washed calcium sulfate from the wash water, and using the wash water for redissolving the mixed titanium sulfates precipitate.

* * * * *